United States Patent
Bruin-Slot et al.

(10) Patent No.: US 10,691,334 B2
(45) Date of Patent: Jun. 23, 2020

(54) COOKING DEVICE WITH INTERACTIVE DISPLAY

(71) Applicant: Whirlpool Corporation, Benton Harbor, MI (US)

(72) Inventors: Zachary J. Bruin-Slot, Baroda, MI (US); John P. Levandowski, St. Joseph, MI (US); Rafael G. Reyes, St. Joseph, MI (US); Brandon L. Satanek, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 254 days.

(21) Appl. No.: 15/393,319

(22) Filed: Dec. 29, 2016

(65) Prior Publication Data

US 2018/0188947 A1  Jul. 5, 2018

(51) Int. Cl.
| | |
|---|---|
| *G06F 3/0488* | (2013.01) |
| *G06F 3/0484* | (2013.01) |
| *G06F 3/0481* | (2013.01) |
| *A47J 37/06* | (2006.01) |
| *H05B 6/64* | (2006.01) |
| *F24C 7/08* | (2006.01) |

(52) U.S. Cl.
CPC ...... *G06F 3/04886* (2013.01); *A47J 37/0664* (2013.01); *F24C 7/082* (2013.01); *G06F 3/04817* (2013.01); *G06F 3/04847* (2013.01); *H05B 6/6435* (2013.01); *G06F 2203/04808* (2013.01)

(58) Field of Classification Search
CPC ............ G06F 3/04886; G06F 3/04847; G06F 3/04817; G06F 2203/04808
See application file for complete search history.

(56) References Cited

U.S. PATENT DOCUMENTS

| | | | |
|---|---|---|---|
| 4,625,086 A | 11/1986 | Karino | |
| 5,438,180 A * | 8/1995 | Eisenbrandt | F24C 7/085 219/413 |
| 5,767,488 A | 6/1998 | Barger et al. | |
| 5,932,130 A * | 8/1999 | Taino | F24C 7/087 219/702 |
| 6,486,453 B1 | 11/2002 | Bales et al. | |
| 6,933,477 B2 | 8/2005 | Becker et al. | |
| 7,131,549 B2 | 11/2006 | Hook | |
| 7,476,828 B2 | 1/2009 | Genua | |
| 7,516,405 B2 | 4/2009 | Burkhart et al. | |
| 8,136,442 B2 | 3/2012 | Strutin-Belinoff et al. | |
| 8,269,151 B2 | 9/2012 | Klasmeier et al. | |
| 8,676,656 B2 | 3/2014 | Ebrom et al. | |
| 9,191,998 B2 * | 11/2015 | Hegedis | A47J 36/321 |
| 9,361,011 B1 * | 6/2016 | Burns | G06F 3/0485 |
| 9,398,888 B2 * | 7/2016 | Yamashita | A61B 6/485 |

(Continued)

FOREIGN PATENT DOCUMENTS

WO   2013133486 A1   9/2013

*Primary Examiner* — Daeho D Song
(74) *Attorney, Agent, or Firm* — Price Heneveld LLP

(57) ABSTRACT

A cooking device is provided herein. The cooking device includes a touch-sensitive display configured to register user-input via one or more touch events to enable a user to make selections related to the operation of the cooking device. The user-input is provided to a controller, and in response, the controller controls the operation of the cooking device based on the user-input.

20 Claims, 6 Drawing Sheets

(56) References Cited

U.S. PATENT DOCUMENTS

| | | | |
|---|---|---|---|
| 9,980,321 B2* | 5/2018 | Sorenson | H05B 1/0266 |
| 2003/0070799 A1* | 4/2003 | Mueller | A47J 39/006 |
| | | | 165/254 |
| 2004/0212636 A1* | 10/2004 | Stata | G06Q 10/109 |
| | | | 715/703 |
| 2004/0256378 A1* | 12/2004 | Shukla | F24C 7/082 |
| | | | 219/490 |
| 2005/0247693 A1* | 11/2005 | Fisher | H05B 1/0266 |
| | | | 219/445.1 |
| 2006/0047654 A1* | 3/2006 | Tkachev | G11B 20/00695 |
| 2007/0090185 A1* | 4/2007 | Lewkowitz | G06Q 30/02 |
| | | | 235/383 |
| 2007/0158335 A1* | 7/2007 | Mansbery | F24C 7/082 |
| | | | 219/505 |
| 2008/0110875 A1* | 5/2008 | Fisher | F24C 7/082 |
| | | | 219/483 |
| 2009/0306827 A1 | 12/2009 | Kim et al. | |
| 2010/0217418 A1* | 8/2010 | Fontanot | G06Q 10/06 |
| | | | 700/100 |
| 2010/0241962 A1* | 9/2010 | Peterson | G06F 3/0481 |
| | | | 715/720 |
| 2011/0011851 A1* | 1/2011 | Kataoka | H05B 6/1218 |
| | | | 219/622 |
| 2011/0062143 A1* | 3/2011 | Satanek | F24C 7/085 |
| | | | 219/489 |
| 2011/0087987 A1 | 4/2011 | Brown | |
| 2012/0003364 A1 | 1/2012 | Kling et al. | |
| 2012/0032514 A1 | 2/2012 | Alberghetti et al. | |
| 2012/0050185 A1* | 3/2012 | Davydov | G06F 3/04883 |
| | | | 345/173 |
| 2012/0192073 A1* | 7/2012 | Vallone | G06F 3/04847 |
| | | | 715/720 |
| 2012/0239762 A1* | 9/2012 | Fisher | H04N 21/4108 |
| | | | 709/206 |
| 2012/0248879 A1 | 10/2012 | Arrigoni et al. | |
| 2012/0331378 A1* | 12/2012 | Baioura | G06Q 10/109 |
| | | | 715/243 |
| 2013/0079073 A1* | 3/2013 | Sharifi | A63F 13/10 |
| | | | 463/3 |
| 2013/0231758 A1* | 9/2013 | Kim | G05B 15/02 |
| | | | 700/90 |
| 2013/0277353 A1 | 10/2013 | Joseph et al. | |
| 2014/0201628 A1 | 7/2014 | Guilleminot et al. | |
| 2015/0160850 A1 | 6/2015 | Krause | |
| 2015/0192302 A1 | 7/2015 | Ortner et al. | |
| 2015/0345068 A1 | 12/2015 | Coffman et al. | |
| 2016/0051078 A1 | 2/2016 | Jenkins et al. | |
| 2016/0246645 A1* | 8/2016 | Yerli | G06F 9/4881 |
| 2016/0253080 A1* | 9/2016 | Ban | H05B 6/6435 |
| | | | 715/771 |
| 2017/0357430 A1* | 12/2017 | Lemay | G11B 27/34 |

\* cited by examiner

COOKING DEVICE WITH INTERACTIVE DISPLAY

FIELD OF THE INVENTION

The present invention generally relates to cooking devices, and more particularly, to cooking devices having interactive displays.

BACKGROUND OF THE INVENTION

Modern day cooking devices often require a user to supply input using a variety of input mechanisms such as buttons, switches, knobs, and the like. As a result, the user may have to rely on one or more of these input mechanisms when operating a particular cooking device. This is not only time consuming, but may lead to errors. Furthermore, current cooking devices often suffer from poor display features for conveying information to the user. As a result, a user is required to invest more time than is necessary in order to extract relevant information from that which is displayed. Accordingly, there is a need for a cooking device that is not only user-intuitive, but offers an enhanced interactive experience.

SUMMARY OF THE INVENTION

According to one aspect of the present invention, a cooking device is provided. A touch-sensitive display is configured to display a virtual timeline spanning a period of time, and a virtual track positioned relative to the virtual timeline. The virtual track is populated with one or more instance blocks that each represent an operation of the cooking device and each have a start time and a duration that is visually related to the virtual timeline. The touch-sensitive display is further configured to register one or more touch events on at least one of the virtual timeline and the virtual track for specifying a delay to the start time of each operation, and in response, shifts the one or more instance blocks along a length of the virtual track such that the one or more instance blocks are positioned relative to the virtual timeline in accordance with the delay. A controller is in communication with the touch-sensitive display and is configured to control the operation of one or more heating elements of the cooking device based on the delay.

According to another aspect of the present invention, a touch-sensitive display is provided for displaying an operation tracking screen for a cooking device. The touch-sensitive display includes a virtual timeline spanning a period of time, and at least one virtual progress bar having one or more instance blocks positioned relative to the virtual timeline and each representing an operation of the cooking device. A virtual progress indicator is configured to move across the virtual timeline and the at least one virtual progress bar in real time to indicate the progress of the operation represented by each of the instance blocks.

According to yet another aspect of the present invention, a method of controlling a cooking device is provided. The method includes the steps of: displaying a virtual timeline spanning a period of time, and a virtual track positioned relative to the virtual timeline, the virtual track being populated with one or more instance blocks that each represent an operation of the cooking device and each having a start time and a duration that is visually related to the virtual timeline; registering one or more touch events on at least one of the virtual timeline and the virtual track for specifying a delay to the start time of each operation; in response to registering the one or more touch events, shifting the one or more instance blocks along a length of the virtual track such that the one or more instance blocks are positioned relative to the virtual timeline in accordance with the delay; and controlling the operation of one or more heating elements of the cooking device based on the delay.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
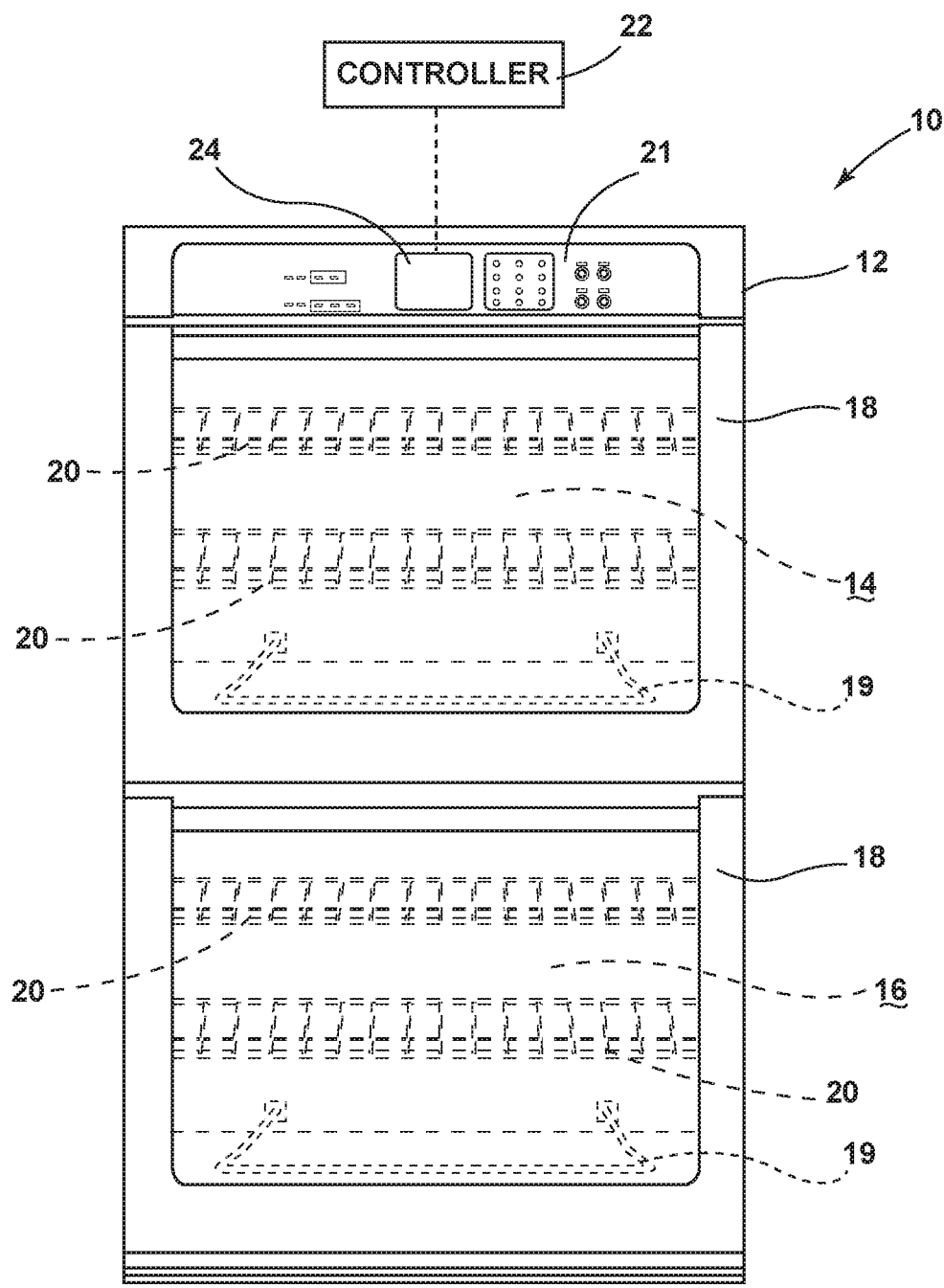
FIG. 1 illustrates a cooking device exemplarily shown as a double oven and having a touch-sensitive display.

Referring to FIG. 1, a cooking device is shown in the form of a double oven generally indicated by reference numeral 10. In the depicted embodiment, the double oven 10 is a wall-mounted or built-in oven, and includes a cabinet 12 that defining two separate oven cavities shown as upper oven cavity 14 and lower oven cavity 16. The upper and lower oven cavities 14, 16 are each selectively sealed by a door 18 that is pivotally coupled to the cabinet 12. The upper and lower oven cavities 14, 16 each include one or more heating elements 19 operable during one or more modes of operation, and may support one or more repositionable racks 20 in any manner known in the art. With respect to the present disclosure, it is to be understood that the details of the double oven 10 provided herein are for illustrative purposes. In general, the present disclosure is directed to a user-interface 21 in communication with a controller 22, and is not meant to be limited for use with any particular oven. Furthermore, it should be appreciated that the disclosure provided herein may extend to other devices used for cooking or other applications such as laundry, for example.

With continued reference to FIG. 1, the user-interface 21 includes a touch-sensitive display 24 configured to display a plurality of interactive user-interface screens. The touch-sensitive display 24 may be any type known in the art including, but not limited to, resistive, capacitive, acoustic, and infrared. The touch-sensitive display 24 is configured to register user-input via one or more touch events to enable a user to make selections related to the operation of the double oven 10. The user-input is provided to the controller 22, and in response, the controller 22 controls the operation of the double oven 10 based on the user-input. For example, the controller 22 may operate the heating element(s) 19 of the upper and/or lower cavity 14, 16 to implement one or more user-selected operations therein.

Figure 2:
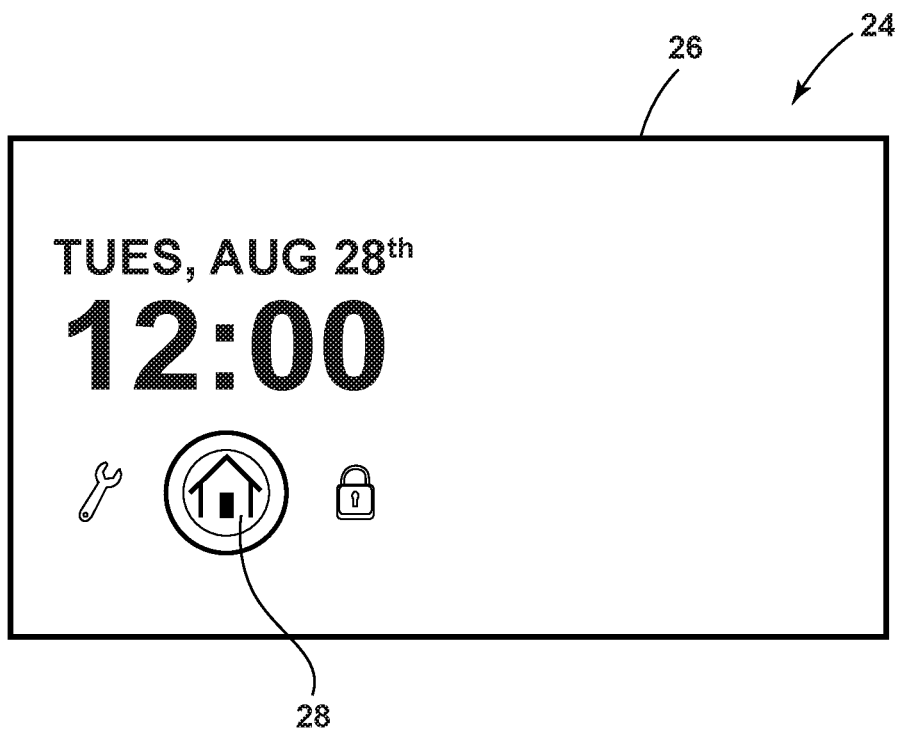
FIG. 2 illustrates a welcome screen of the touch-sensitive display.

Referring to FIG. 2, the touch-sensitive display 24 is configured to display a welcome screen 26 that includes a home menu icon 28, the current date and time, and other selectable features that will not be discussed herein for the sake of brevity. The home menu icon 28 is selected via a touch event (i.e., touching the home menu icon 28). The touch-sensitive display 24 is configured to register the touch event, and in response, display a home screen 32 depicted in FIG. 3.

Figure 3:
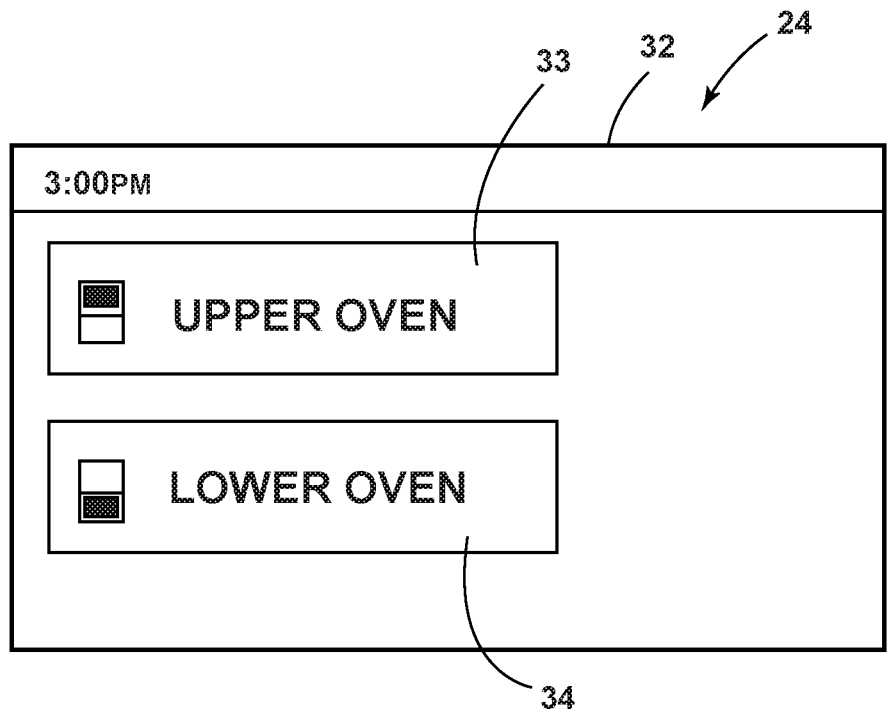
FIG. 3 illustrates a home screen of the touch-sensitive display enabling a user to select between an upper and lower cavity of the double oven.

With reference to FIG. 3, the home screen 32 enables the user to select between the upper and lower oven cavities 14, 16. The home screen 32 includes a virtual button 33 associated with the upper oven cavity 14, and a virtual button 34 associated with the lower cavity 16. Additionally, it is contemplated that the home screen 32 may show other information, selectable options, and the like. In the depicted embodiment, virtual buttons 33 and 34 each include descriptive indicia exemplarily appearing as text and/or a graphical icon visually relating virtual buttons 33 and 34 to the upper and lower oven cavities 14, 16, respectively. To select between the upper and lower oven cavities 14, 16, a user simply touches the corresponding virtual button 33, 34. The touch event selecting the upper oven cavity 14 or the lower oven cavity 16 is registered by the touch-sensitive display 24, and in response, the touch-sensitive display 24 displays a mode selection screen 36 depicted in FIG. 4.

Figure 4:
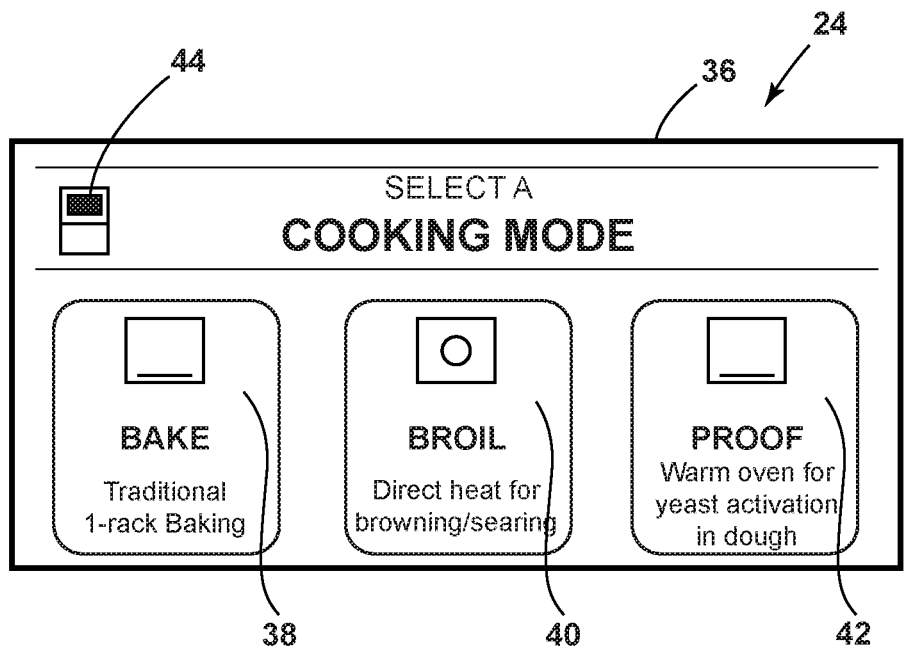
FIG. 4 illustrates a mode selection screen of the touch-sensitive display enabling the user to select between a number of mode of operations related to cooking.
Figure 5:
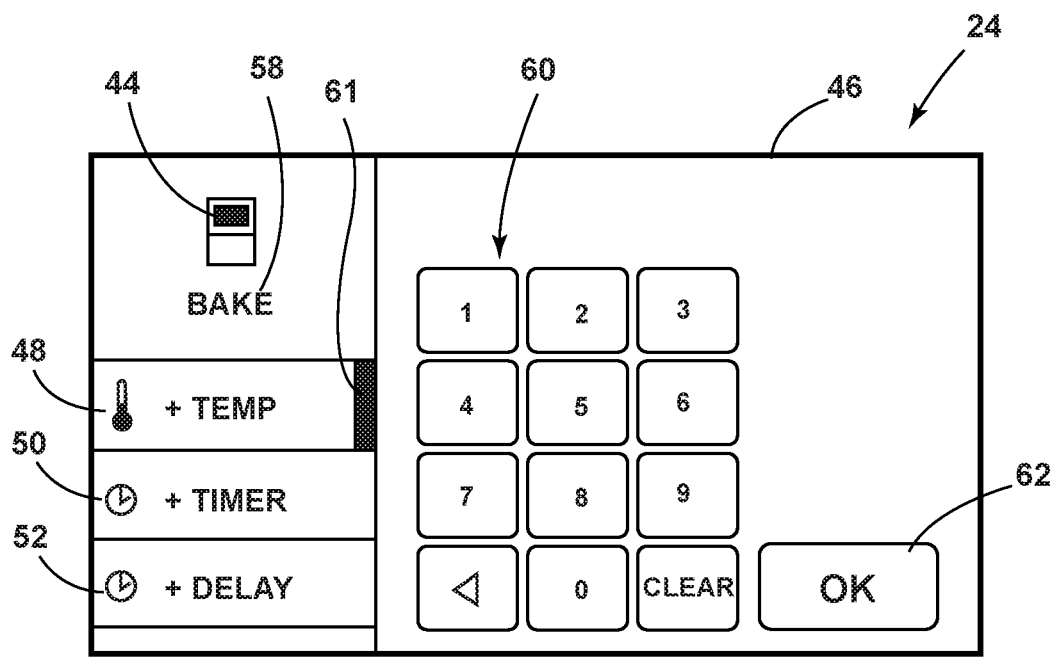
FIG. 5 illustrates a mode settings screen of the touch-sensitive display enabling the user to make selections related to a temperature setting, a timer setting, and a delay setting.

Referring now to FIG. 4, the mode selection screen 36 enables a user to select between a plurality of modes of operation (e.g., cooking modes) available to whichever oven cavity 14, 16 was selected from the home screen 32. In the depicted embodiment, the mode selection screen 36 includes virtual button 38 associated with a bake mode, virtual button 40 associated with a broil mode, and virtual button 42 associated with a proof mode. Virtual buttons 38-42 may each include descriptive indicia exemplarily appearing as text and/or a graphical icon visually relating the virtual buttons 38-42 to the corresponding mode of operation. Additionally, the mode selection screen 36 includes an oven cavity icon 44 indicating the selected cavity (e.g., upper oven cavity 14). To select between the modes of operation, a user touches the corresponding virtual button 38-42. It is to be understood that the same modes of operation are generally available to both the upper and lower oven cavities 14, 16. Alternatively, the upper and lower oven cavities 14, 16 may each include different modes of operation in addition to ones not specifically mentioned herein.

Once the user selects a mode of operation from the mode selection screen 36, the touch-sensitive display 24 displays a mode settings screen 46 depicted in FIGS. 5-9. The mode settings screen 46 enables the user to customize one or more settings related to the mode of operation selected from the mode selection screen 36. As shown, the mode settings screen 46 includes virtual button 48 associated with a temperature setting, virtual button 50 associated with a timer setting, virtual button 51 associated with an end-stage operation setting, virtual button 52 associated with a delay setting, virtual button 54 associated with a favorites menu, and virtual button 56 associated with an information menu. Virtual buttons 48-56 may each include descriptive indicia exemplarily appearing as text and/or a graphical icon visually relating the virtual buttons 48-56 to the corresponding setting or menu option. The mode settings screen 46 also includes oven cavity icon 44 indicating the selected cavity (e.g., the upper oven cavity 14), and a mode descriptor 58 embodied as text indicating the selected mode of operation (e.g., BAKE).

In operation, the user first selects virtual button 48 to input the temperature setting, which relates to an operating temperature of the selected mode of operation. The temperature setting is inputted by touching virtual button 48 and entering a desired temperature in degrees Celsius or Fahrenheit using virtual number pad 60 depicted in FIG. 5. Virtual button 48 may be highlighted, flashed, or otherwise exhibit a perceptible change in constitution to notify a user of its selection. As exemplarily depicted in FIG. 5, a portion 61 of virtual button 48 is highlighted when selected by the user. It will be understood that the selection of other virtual buttons may produce similar visual responses. The desired temperature may be subsequently displayed on virtual button 48 and may replace any descriptive indicia appearing thereon if necessary. For example, each digit of the desired temperature may be displayed dynamically as it is being entered by the user or once the desired temperature has been entered in its entirety and confirmed by the user. The user may confirm entry of the desired temperature by touching virtual confirmation button 62 or touching another virtual button, typically virtual button 50.

Selection of virtual button 50 enables the user to input the duration for the selected mode of operation. The duration is inputted by touching virtual button 50 and entering a desired duration using virtual number pad 60. The desired duration may be entered in hours, minutes, seconds, or a combination thereof. The desired duration may be subsequently displayed on virtual button 50 and may replace any descriptive indicia appearing thereon if necessary. The desired duration may be displayed dynamically as it is being entered by the user or once the desired duration has been entered in its entirety and confirmed by the user. The user confirms the desired duration by touching virtual confirmation button 62.

Once the selected temperature setting (e.g., 400° F.) and the selected timer setting (e.g., 20 minutes) have been inputted, the touch-sensitive display 24 is configured to display virtual button 51 on the mode settings screen 46 depicted in FIGS. 6-9. As shown, the virtual button 51 appears between virtual buttons 50 and 52. Selection of virtual button 51 enables the user to specify an end-stage operation for supplementing the selected mode of operation.

Figure 6:
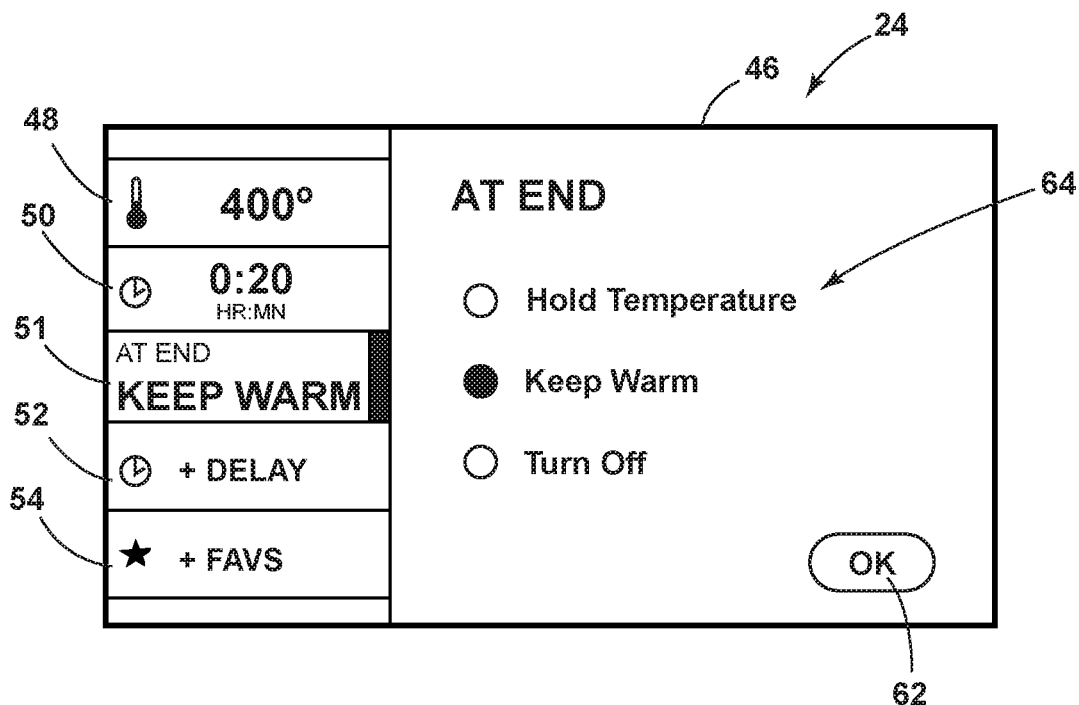
FIG. 6 illustrates the selection of an end-stage operation on the mode settings screen.

The end-stage operation setting is inputted by touching virtual button 51, thereby prompting a list 64 of available end-stage operations to be displayed on the mode settings screen 46 depicted in FIG. 6. For purposes of illustration, the end-stage operations are exemplarily shown as a "Hold Temperature" operation, a "Keep Warm" operation, and a "Turn Off" operation, each of which is selectable via a touch event.

Selection of the "Hold Temperature" operation specifies for the selected temperature setting to be maintained for a period of time after the expiration of the selected timer setting. Selection of the "Keep Warm" operation specifies for the selected temperature to be adjusted, if necessary, to a predetermined temperature that is ideal for keeping food warm and is maintained for a period of time after the expiration of the selected timer setting. Lastly, selection of the "Turn Off" operation specifies for the mode of operation to be immediately ended after the expiration of the selected timer setting. The selection of an end-stage operation is confirmed by touching confirmation button 62. It is contemplated that the selected end stage operation (e.g., the "Keep Warm" operation) may be displayed on virtual button 51 and may replace any descriptive indicia appearing thereon if necessary. If applicable, the user may specify the duration for the selected end stage operation. It should be appreciated, however, that the user is not necessarily required to select an end stage operation. For example, the "Turn OFF" operation or other operation may be provided as default, thereby allowing the user to skip the selection of an end stage operation.

Figure 7:
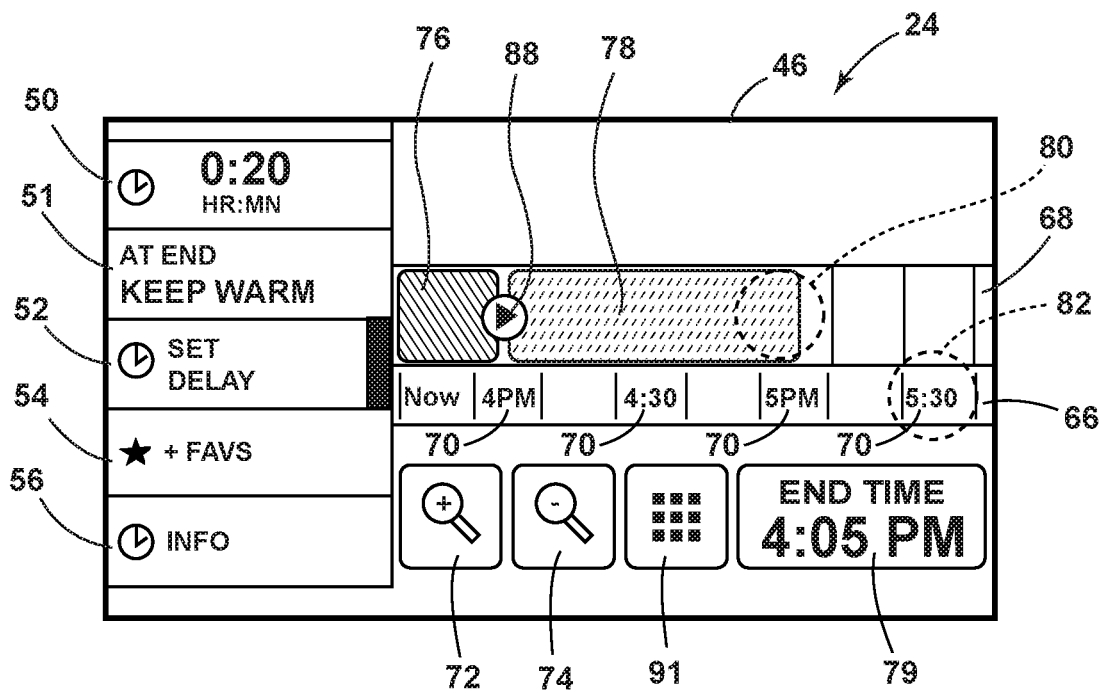
FIGS. 7-9 illustrate the inputting of a delay on the mode settings screen.

The delay setting enables the user to adjust or delay a start time of the selected mode of operation, and is next selected by touching the virtual button 52, which prompts the touch-sensitive display 24 to display a virtual timeline 66 and a virtual track 68 on the mode settings screen 46 depicted in FIG. 7. As shown, the virtual timeline 66 includes digital time indicia 70 located at intervals along the virtual timeline 66 and adjustable using virtual toggle buttons 72 and 74. The virtual timeline 66 spans a time period including the current time up to a later time. The virtual track 68 may be positioned directly above the virtual timeline 66 and is populated with a number of instance blocks, each representing an operation selected previously by the user and each having a start time and a duration that is visually related to the virtual timeline 66.

As depicted in FIG. 7, the virtual track 68 includes a first instance block 76 corresponding to the selected mode of operation (e.g., the bake operation) followed by a second instance block 78 corresponding to the selected end stage operation (e.g., the "Keep Warm" operation). The first and second instance blocks 76, 78 may be displayed in different colors and may include text displayed thereon to indicate the nature of the operation. The first and second instance blocks 76, 78 are each scaled based on their duration and are initially positioned in order at the earliest available start time relative to the virtual timeline 66. More specifically, the first instance block 76 is scaled according to the selected timer setting (e.g., 20 minutes) and is positioned at the earliest available start time whereas the second instance block 78 is scaled according to a user-specified duration (e.g., 1 hour) and is positioned after the first instance block 76. A corresponding end time block 79 may be displayed on the mode settings screen 46. In the depicted embodiment, the end time block 79 includes a projected end time (e.g., 4:05 PM) for the selected mode of operation based on the position of the first instance block 76 relative to the virtual timeline 66. Alternatively, the projected end time may be that of the selected end stage operation based on the position of the second instance block 78 relative to the virtual timeline 66.

To specify a delay to the start time for the selected operation(s), the user performs one or more touch events on the virtual track 68, the virtual timeline 66, or a combination thereof. For example, if the user wishes to delay the start time to a desired start time (e.g., 5 PM) inside the time period of the virtual timeline 66, the user need only touch the corresponding portion (e.g., point 80) of the virtual track 68. The touch-sensitive display 24 is configured to register the touch event and responds by shifting the first and second instance blocks 76, 78 along the length of the virtual track 68 such that the first and second instance blocks 76, 78 are positioned relative to the virtual timeline 66 in accordance with the delay. That is, the first instance block 76 is positioned to have its start time coincide with the desired start time and is followed in turn by the second instance block 78.

Figure 8:
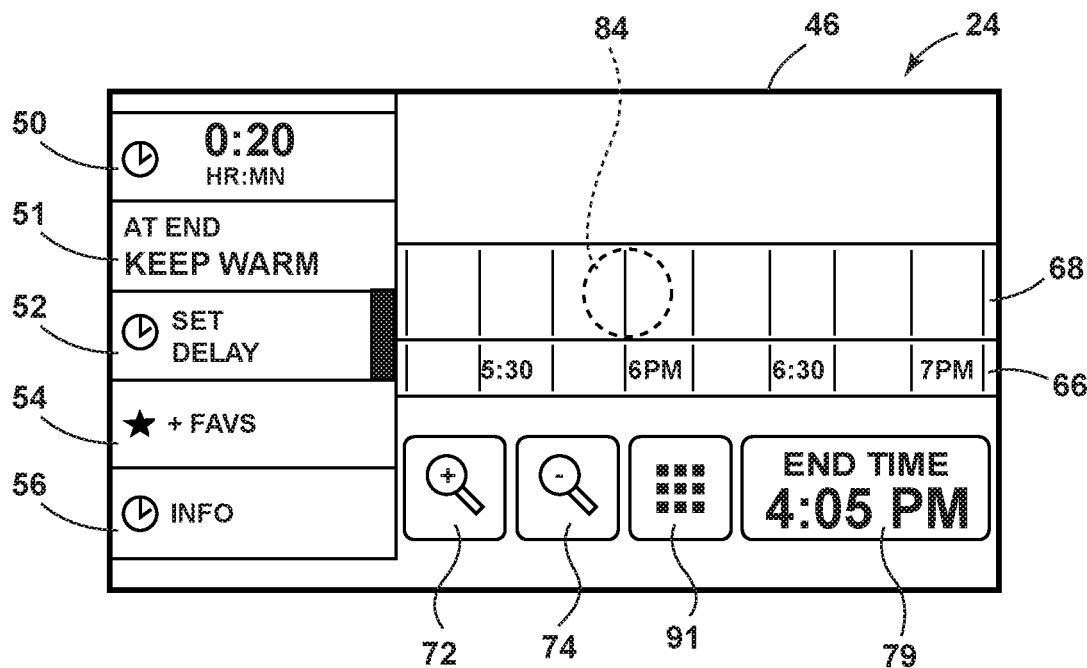
Figure 9:
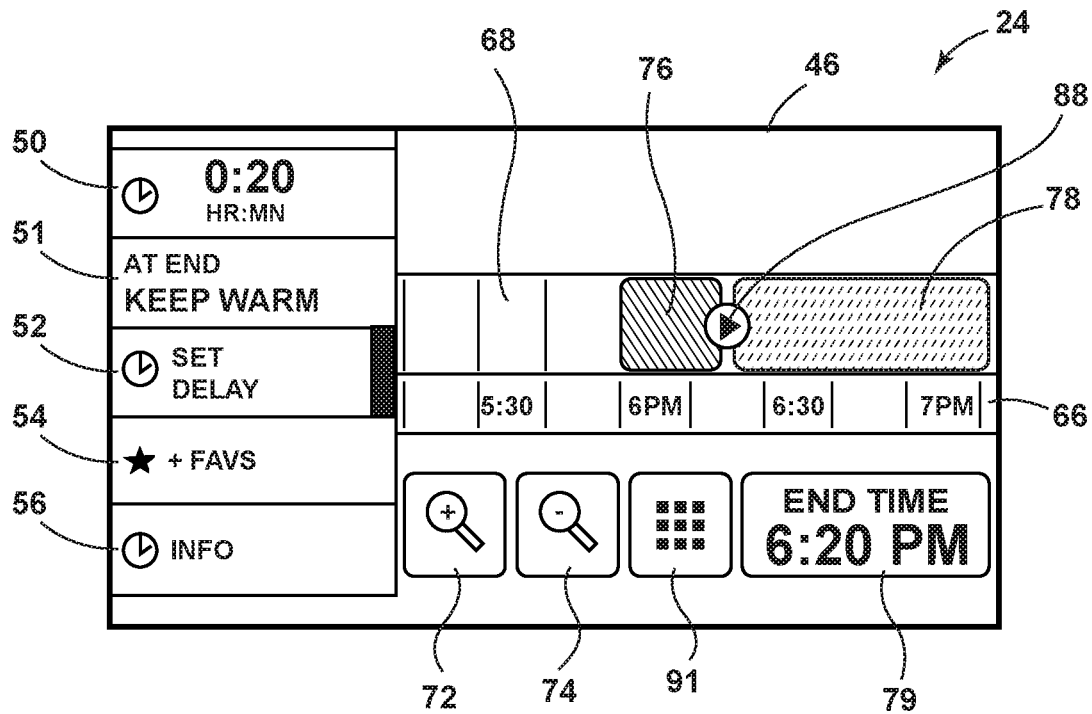

If the user wishes to delay the start time to a desired start time (e.g., 6 PM) outside the time period of the virtual timeline 66, the user first touches a later point (e.g., point 82) on the virtual timeline 66. The touch-sensitive display 24 is configured to register the touch event and responds by advancing the virtual timeline 66 and the virtual track 68 as depicted in FIG. 8. As a result, the time period of the virtual timeline 66 now includes later times previously unavailable. Next, the user touches a point (e.g., point 84) on the virtual track 68 that corresponds to the desired start time inside the virtual timeline 66. The touch-sensitive display 24 is configured to register the touch event and responds by shifting the first and second instance blocks 76, 78 along the length of the virtual track 68 such that the first and second instance blocks 76, 78 are positioned relative to the virtual timeline 66 in accordance with the delay. That is, the first instance block 76 is positioned to have its start time coincide with the desired start time and is followed in turn by the second instance block 78 as depicted in FIG. 9. The projected end time in end time block 79 is updated in turn (e.g., 6:20 PM). In either case described above, the desired start time may be fine-tuned using toggle buttons 72 and 74, if necessary, and a subsequent touching of virtual button 52 sets the delay setting according to the desired start time.

Figure 10:
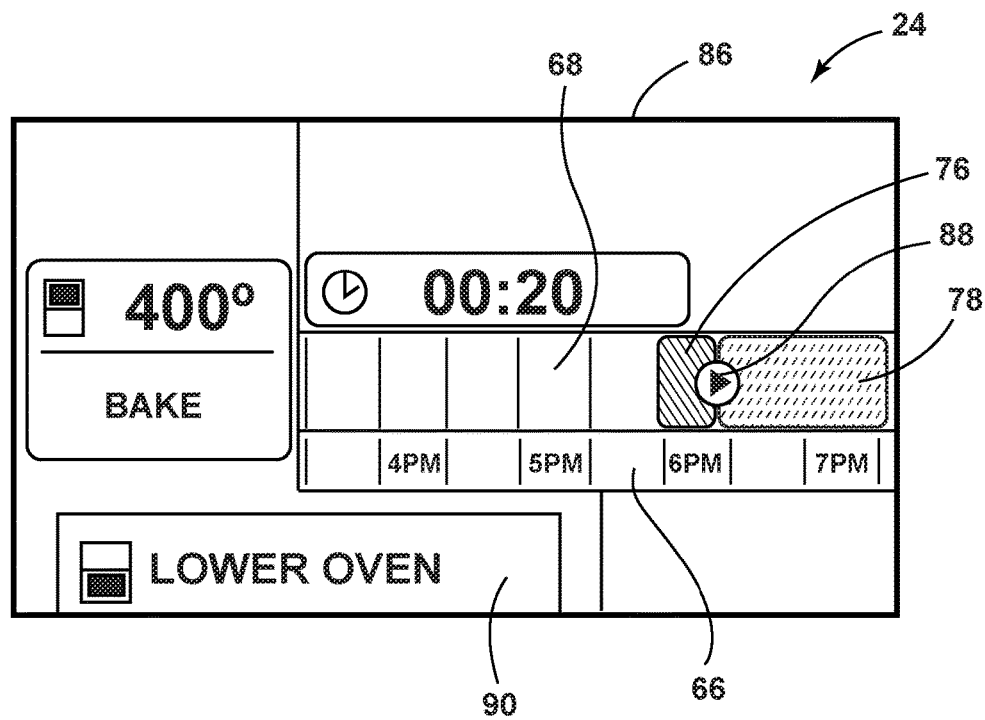
FIG. 10 illustrates a start screen updated with information based on selections made on the home screen, mode selection screen, and the mode settings screen.

The touch-sensitive display 24 registers the touch event and responds by displaying a start screen 86 depicted in FIG. 10. A user desiring no delay need simply touch virtual button 52 twice to accomplish the same. Alternatively, a shortcut may be provided to skip the inputting of the delay setting, if desired. As shown in FIG. 10, the start screen 86 includes the virtual timeline 66 and the virtual track 68, both of which are updated, if necessary, to show the instance block(s) at the desired start time, which may or may not be delayed. In the depicted embodiment, the first and second instance blocks 76, 78 are positioned on the virtual track 68 in accordance with the desired start time of 6 PM, as described previously herein. The start screen 86 may also display information relevant to the selected operation(s) such as the selected temperature setting, timer setting, and oven cavity, for example. If satisfied with his or her selections, the user touches virtual start button 88, and in response, the controller 22 controls the operation of the double oven 10 according to the selections made by the user. The virtual start button 88 may be positioned on the virtual track 68 or anywhere else on the start screen 86. The virtual start button 88 may also be made accessible from the mode settings screen 46 depicted in FIGS. 7, 9, and 10, if desired.

As an additional feature, the start screen 86 includes virtual button 90 with which the user is able to select (via a touch event) an unused oven cavity (e.g., lower oven cavity 16). From there, the user may make selections related to one or more operations to be carried out in the unused oven cavity whilst navigating through the mode selection screen 36 and the mode settings screen 46, as described herein with reference to FIGS. 4-9. In this manner, a number of operations may be assigned to both oven cavities in relatively quick succession.

As an alternative to inputting the temperature setting, timer setting, end-stage operation setting, and delay setting, the user may touch virtual button 54 (FIGS. 6-9) and select a favorite operation to be performed in the selected cavity at predefined settings. The favorite operation may be selected from a list of favorites stored in memory and may have a name previously assigned thereto by the user. Upon selecting a favorite operation (e.g., via a touch event), the start screen 86 is automatically updated in accordance with the predefined settings of the favorite operation. At this point, the user need only touch virtual start button 88 to set the favorite operation in motion.

As yet another alternative to inputting the temperature setting, timer setting, end-stage operation setting, and delay setting, the user may touch virtual button 56 and select a recent operation from a running list of recent operations stored in memory. Like the favorite operation, the recent operation includes predefined settings and is selectable via a touch event, thereby causing the start screen 86 to be automatically updated in accordance with the predefined settings of the recent operation. At this point, the user need only touch virtual start button 90 to set the recent operation in motion. Additionally, it is contemplated that selection of virtual button 56 enables the user to access a variety of information concerning double oven 10. The information may be embodied as text, images, and/or videos serving to assist the user in understanding and employing the features of the double oven 10 as well as general troubleshooting. As depicted in FIGS. 7-9, the mode settings screen 46 includes a virtual navigation icon 91, that when touched, enables the user to navigate the various screens and menus described herein.

Figure 11:
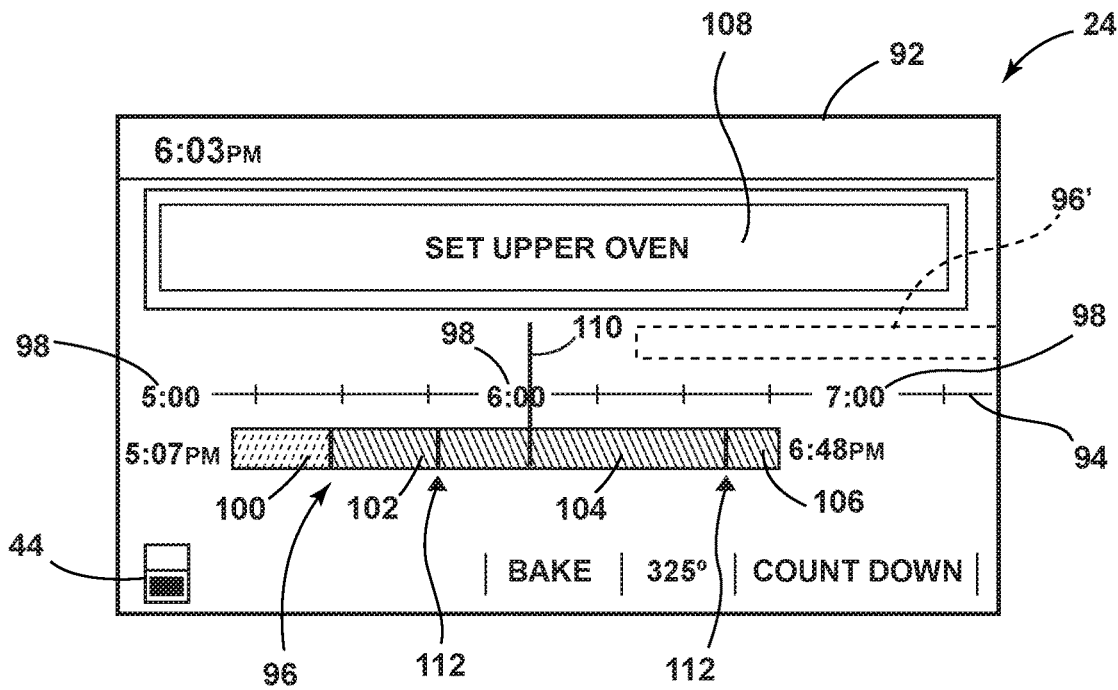
FIG. 11 illustrates an operation tracking screen of the touch-sensitive display enabling the user to track the progress of one or more operations of the double oven.

Upon registering a touch event on virtual start button 88, the touch-sensitive display 24 is configured to display an operation tracking screen 92 depicted in FIG. 11. The operation tracking screen 92 enables the user to visually track the progress of one or more selected operation(s) intended to be carried out in a selected oven cavity or cavities. The operation tracking screen 92 includes a virtual timeline 94 and at least one virtual progress bar such as virtual progress bar 96, which is positioned relative the virtual timeline 94. The virtual timeline 94 includes digital time indicia 98 located at intervals along the virtual timeline 94. The virtual timeline 94 spans a time period including a past time, the current time, and a later time. In the depicted embodiment, the virtual progress bar 96 includes a plurality of instance blocks, exemplarily shown as instance blocks 100-106, each representing a selected operation intended to be carried out in the lower oven cavity 16, and each being scaled by its duration relative the virtual timeline 94.

Each operation, along with its start time and duration, may be selected via user-input or otherwise automatically implemented by the controller 22. For reference, the virtual progress bar 96 is located directly below the virtual timeline 94 to visually associate the virtual progress bar 96 with the lower oven cavity 16. In contrast, a virtual progress bar (e.g., virtual progress bar 96') having one or more instance blocks representing operations intended to be carried out in the upper oven cavity 14 is typically displayed above the virtual timeline 94 for visual reference. Virtual progress bar 96' may be displayed at its illustrated position relative to the virtual timeline 94 as a result of selections made previously, or subsequent to touching virtual button 108 and making selections related to operations intended to be carried out in the upper oven cavity 14 pursuant to any of the methodologies described previously herein. Thus, it will be understood that one or both of virtual progress bars 96 and 96' may be displayed based on whether operations are intended to be carried out in one or both of the upper and lower oven cavities 14, 16. The relative positions of the virtual progress bars 96, 96' are provided for purposes of illustration and are independent of one another. In some embodiments, a virtual progress bar may be located beyond the time period of the virtual timeline 94 such that is it not visible until the virtual timeline 94 is advanced.

In the depicted embodiment, instance block 100 represents a preheating operation that ends once the temperature in the lower oven cavity 16 reaches a selected temperature setting (e.g., 325° F.) for a first mode of operation (e.g., a bake operation) represented by instance block 104. Instance block 102 represents a maintenance operation whereby the selected temperature setting is maintained up until the scheduled start time of the first mode of operation. Lastly, instance block 106 represents a second mode of operation (e.g., a broil operation) that commences after the scheduled duration of the first mode of operation. Alternatively, instance block 106 may represent an end-stage operation (e.g., the "Keep Warm" operation). The scheduled start times and durations for the operations associated with instance blocks 100-106 may be specified by the user according to any of the methodologies described previously herein.

As is further depicted, the operation tracking screen 92 also includes a virtual progress indicator 110 that is configured to move across the virtual timeline 94 and virtual progress bar 96 in real time in order to indicate the progress of the operation(s) relative to the virtual timeline 94. In the depicted embodiment, the virtual progress indicator 110 is embodied as a vertical bar and its position relative the virtual timeline 94 and virtual progress bar 96 indicates that the operations represented by instance blocks 100 and 102 have ended, the operation represented by instance block 104 is in progress, and the operation represented by instance block 106 has not yet started. Additionally, the position of the virtual progress indicator 110 indicates that the operation(s) of virtual progress bar 96' have yet to start. It is contemplated that the instance blocks 100-106 of virtual progress bar 96 may each be displayed in different colors or exhibit other distinguishing visual effects. The instance block(s) of virtual progress bar 96 may exhibit similar visual effects.

For example, instance block 104 may be highlighted or made to flash in order to indicate that the associated operation is in progress. Additionally or alternatively, text indicating an operation in progress may be flashed inside the virtual progress bar 96 or elsewhere on the operation tracking screen 92. As is further illustrated, information related to an operation in progress may be displayed on the operation tracking screen 92. Such information may include an operation descriptor (e.g., BAKE), a temperature setting (e.g., 325° F.), and a countdown of a timer setting related to an operation in progress. Additional information that may be displayed on the operation tracking screen 92 includes the oven cavity icon 44, the start time (e.g., 5:07 PM), a projected end time (e.g., 6:48 PM), and the current time (e.g., 6:03 PM). Information related to operations carried out in the lower oven cavity 16 is displayed below the virtual timeline 94 for visual reference. In contrast, similar information (not shown) related to operations carried out in the upper oven cavity 14 is displayed above the virtual timeline 94.

It is contemplated that the instance blocks of the virtual progress bars 96 and 96' may be displayed concurrently, or in progression based on the position of the virtual progress indicator 110. For example, each of the instance blocks is progressively displayed when the virtual progress indicator 110 reaches its scheduled start time. Thus, by virtue of the position of the virtual progress indicator 110 in the depicted embodiment, only instance blocks 100-104 are displayed whereas instance block 106 is hidden until the virtual progress indicator 110 reaches its scheduled start time. Likewise, the instance block(s) of virtual progress bar 96' are hidden. In some embodiments, it is contemplated that the instance blocks (e.g., instance blocks 100 and 102) representing completed operations may be subsequently hidden or otherwise obscured to indicate their passing. In some embodiments, a virtual pointer icon 112 may be displayed concurrently or in progression to enable the user to ascertain a start point for a mode of operation. In the depicted embodiment, a virtual pointer icon 112 is assigned to each of instance blocks 104 and 106.

When the virtual progress indicator 110 nears or reaches the end of the time period of the virtual timeline 94, the virtual timeline 94 is advanced such that later times become available for display. As a result, the remaining portion of virtual progress bar 96' will become displayed on operation tracking screen 92. Once the virtual progress indicator 110 has run its course (i.e., moved past all virtual progress bar(s)), the user may be notified that the operation(s) carried out in the upper and/or lower cavity 14, 16 has completed. For example, a text notification may be displayed on the operation tracking screen 92. The user may also save the completed operation(s) to favorites and assign a name thereto. Additionally, the completed operation(s) are automatically added to the list of recent operations.

According to one embodiment, the double oven 10 is configured to operate in a showroom mode, whereby the controller 22 is prevented from controlling the operation of the heating element(s) 19. In such an instance, the touch-sensitive display 24 remains operational to allow the user to navigate through the various screens and menus described herein for demonstration and viewing purposes. For example, the user may still make selections on the mode settings screen 46, including specifying a delay, and may subsequently track the progress of a selected operation(s) via the operation tracking screen 92. It is further contemplated that the touch-screen display 24 and related functionality may be presented on a webpage for similar purposes. In this way, a potential purchaser of the double oven 10 may navigate through the various screens and menus in accordance with the methodologies described herein using a mouse or other selection device of a computer displaying the webpage. In this manner, the potential purchaser gains firsthand knowledge and experience with respect to the features of the double oven 10, and as a result, the potential purchaser may make more informed purchasing decisions.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A cooking device comprising:
a touch-sensitive display configured to display at least one virtual button corresponding to a mode of operation of the cooking device to be selected by a user, a virtual timeline spanning a period of time, and a virtual track positioned separate from and adjacent to the virtual timeline;
wherein the virtual track is populated with one or more instance blocks progressively displayed along the virtual track that each of the one or more instance blocks represents a user-selected mode of operation of the cooking device and defines a start time and a duration that is visually related to the virtual timeline;
wherein the one or more instance blocks are communicatively coupled to an end time block that includes a projected end time to be displayed for the selected mode of operation based on a position of an instance block relative to the virtual timeline;
wherein the touch-sensitive display is further configured to register one or more touch events of the user corresponding to respective mode operations of the cooking device on at least one of the virtual timeline and the virtual track for specifying a delay to a user-desired start time of each selected mode of operation of the cooking device, and in response to the specified delay, automatically shifts the one or more instance blocks together along a length of the virtual track such that the one or more instance blocks are positioned to have its start time coincide with the user-desired start time relative to the virtual timeline in accordance with the specified delay;
one or more heating elements; and
a hardware controller in communication with the touch-sensitive display and configured to control the operation of the one or more heating elements of the cooking device based on the specified delay to the user-desired start time.

2. The cooking device of claim 1, wherein the one or more touch events comprises a single touch event on the virtual track at a point corresponding to a desired start time inside the time period of the virtual timeline, and wherein the touch-sensitive display registers the touch event and responds by shifting the one or more instance blocks along the length of the virtual track such that the start time of at least one of the instance blocks coincides with the desired start time.

3. The cooking device of claim 1, wherein the one or more touch events comprises a first and second touch event, wherein the first touch event is performed on a later point of the virtual timeline and is registered by the touch-sensitive display, which responds by advancing the virtual timeline and the virtual track such that the time period of the virtual timeline now includes times previously unavailable, and wherein the second touch event is performed on a point corresponding to a desired start time previously outside the time period and is registered by the touch-sensitive display, which responds by shifting the one or more instance blocks along the length of the virtual track such that the start time of at least one of the instance blocks coincides with the desired start time.

4. The cooking device of claim 1, wherein at least one of the instance blocks represents one of a bake operation, a broil operation, and a proof operation.

5. The cooking device of claim 1, wherein the one or more instance blocks are positioned along the virtual track in a predetermined order.

6. The cooking device of claim 1, configured to operate in a showroom mode, whereby the controller is prevented from controlling the operation of the one or more heating elements, and wherein the touch-sensitive display remains operational to allow the delay to be specified for demonstration and viewing purposes.

7. The cooking device of claim 1, wherein the operation represented by each instance block is defined by settings associated with a favorite operation or a recently used operation selected by the user.

8. A touch-sensitive display device disposed on a cooking device for displaying an operation tracking screen for the cooking device, the touch-sensitive display device comprising:
a virtual timeline spanning a period of time, wherein the virtual timeline is configured to respond to one or more touch events of the user corresponding to respective mode operations of the cooking device;
a plurality of virtual progress bars comprising one or more instance blocks positioned separate from and relative to the virtual timeline and each of the one or more instance blocks representing a user-selected mode of operation of the cooking device and progressively displayed defining a start time and a duration that is visually related to the virtual timeline
wherein the one or more instance blocks are communicatively coupled to an end time block that includes a projected end time to be displayed for the user-selected mode of operation based on a position of an instance block relative to the virtual timeline;
a virtual progress indicator configured to move relative the virtual timeline and the plurality of virtual progress bars in real time to indicate the progress of the operation represented by each of the instance blocks; and
a hardware controller configured to register the one or more touch events of the user corresponding to respective mode operations of the cooking device on at least one of the virtual timeline and the plurality of virtual progress bars for specifying a delay to a user-desired start time of each selected mode of operation of the cooking device, and in response to the specified delay, automatically shifts the one or more instance blocks together along a length of the plurality of virtual progress bars such that the one or more instance blocks are positioned to have its start time coincide with the user-desired start time relative to the virtual timeline in accordance with the specified delay.

9. The touch-sensitive display of claim 8, wherein the virtual progress indicator comprises a vertical bar.

10. The touch-sensitive display of claim 8, wherein the one or more instance blocks are displayed concurrently.

11. The touch-sensitive display of claim 8, wherein each of the instance blocks is progressively displayed based on the position of the virtual progress indicator.

12. The touch-sensitive display of claim 11, wherein an instance block is only displayed when the virtual progress indicator reaches a scheduled start time of the instance block.

13. The touch-sensitive display of claim 8, configured to be presented on a webpage for viewing purposes.

14. A method of controlling a cooking device, comprising the steps of:
selecting by a user at least one virtual button corresponding to a mode of operation of the cooking device;
displaying a virtual timeline spanning a period of time, and a virtual track positioned separate from and adjacent to the virtual timeline;
wherein the virtual track is populated with one or more instance blocks progressively displayed along the virtual track that each of the one or more instance blocks represents a user-selected mode of operation of the cooking device and defines a start time and a duration that is visually related to the virtual timeline;
wherein the one or more instance blocks are communicatively coupled to an end time block that includes a projected end time to be displayed for the user-selected mode of operation based on a position of an instance block relative to the virtual timeline;
registering one or more touch events of the user corresponding to respective mode operations of the cooking device on at least one of the virtual timeline and the virtual track for specifying a delay to a user-desired start time of each selected mode of operation of the cooking device;
in response to registering the one or more touch events, automatically shifting the one or more instance blocks together along a length of the virtual track such that the one or more instance blocks are positioned to have their start time coincide with the user-desired start time relative to the virtual timeline in accordance with the specified delay; and
controlling the operation of one or more heating elements of the cooking device based on the specified delay to the user-desired start time.

15. The method of claim 14, wherein the step of registering comprises:
registering a single touch event on the virtual track at a point corresponding to a desired start time inside the time period of the virtual timeline; and
shifting the one or more instance blocks along the length of the virtual track such that the start time of at least one of the instance blocks coincides with the desired start time.

16. The method of claim 14, wherein the step of registering comprises:
registering a first touch event on a later point of the virtual timeline;
in response to registering the first touch event, advancing the virtual timeline and the virtual track such that the time period of the virtual timeline now includes times previously unavailable;
registering a second touch event on a point corresponding to a desired start time previously outside the time period; and
in response to registering the second touch event, shifting the one or more instance blocks along the length of the virtual track such that the start time of at least one of the instance blocks coincides with the desired start time.

17. The method of claim 14, wherein at least one of the instance blocks represents one of a bake operation, a broil operation, and a proof operation.

18. The method of claim 14, wherein the one or more instance blocks are positioned along the virtual track in a predetermined order.

19. The method of claim 14, further comprising the step of operating the cooking device in a showroom mode, whereby operation of the one or more heating elements is disabled, and wherein the delay is specified for demonstration and viewing purposes.

20. The method of claim 14, wherein the operation represented by each instance block is defined by settings associated with a favorite operation or a recently used operation selected by the user.

* * * * *